United States Patent

Duran

Patent Number: 5,699,944
Date of Patent: Dec. 23, 1997

[54] VEHICLE ROOF RACK ASSEMBLY

[75] Inventor: John A. Duran, Glendora, Calif.

[73] Assignee: Avibank Mfg., Inc., Burbank, Calif.

[21] Appl. No.: 686,245

[22] Filed: Jul. 25, 1996

[51] Int. Cl.$^6$ ............................................. B60R 9/04
[52] U.S. Cl. .................... 224/326; 224/309; 411/85; 411/908
[58] Field of Search ..................... 224/309, 322, 224/325, 326; 403/393; 411/60, 907, 908, 85, 41, 508, 509, 510; 4/236, 240

[56] References Cited

U.S. PATENT DOCUMENTS

| | | | |
|---|---|---|---|
| 1,835,710 | 12/1931 | Jenkins et al. | |
| 1,873,450 | 8/1932 | McFarlin | |
| 3,408,665 | 11/1968 | Harris | 5/304 |
| 4,162,755 | 7/1979 | Bott | 224/326 |
| 4,165,827 | 8/1979 | Bott | 224/326 |
| 4,277,009 | 7/1981 | Bott | 224/309 |
| 4,299,346 | 11/1981 | Helm | 224/326 |
| 4,448,336 | 5/1984 | Bott | 224/309 |
| 4,478,545 | 10/1984 | Mizusawa et al. | 411/908 |
| 4,776,737 | 10/1988 | Wollar | 411/908 |
| 4,915,343 | 4/1990 | Terlecke | 411/908 |
| 4,970,731 | 11/1990 | Fait | 4/236 |
| 5,419,665 | 5/1995 | Adams et al. | 441/84 |
| 5,497,925 | 3/1996 | Lumpe et al. | 224/326 |
| 5,499,762 | 3/1996 | Lee | 224/326 |

FOREIGN PATENT DOCUMENTS 2064048  6/1981  United Kingdom .

*Primary Examiner*—Henry J. Recla
*Assistant Examiner*—Gregory M. Vidovich
*Attorney, Agent, or Firm*—Oppenheimer Poms Smith

[57] ABSTRACT

A vehicle roof rack assembly for retaining a roof rack to the roof of a vehicle. The assembly includes a plurality of spanners which span a pair of spaced round holes through the roof of the vehicle at preselected locations. Each spanner includes a main body portion having spaced integral downwardly extending insert portions or apertured bosses which extend into the spaced round holes. These apertured bosses are self tapping for receiving screws therein. Thus, the rack, having holes at each end aligned with the apertured bosses, receives a self tapping screw in each apertured boss securing the rack to the roof of the vehicle.

13 Claims, 3 Drawing Sheets

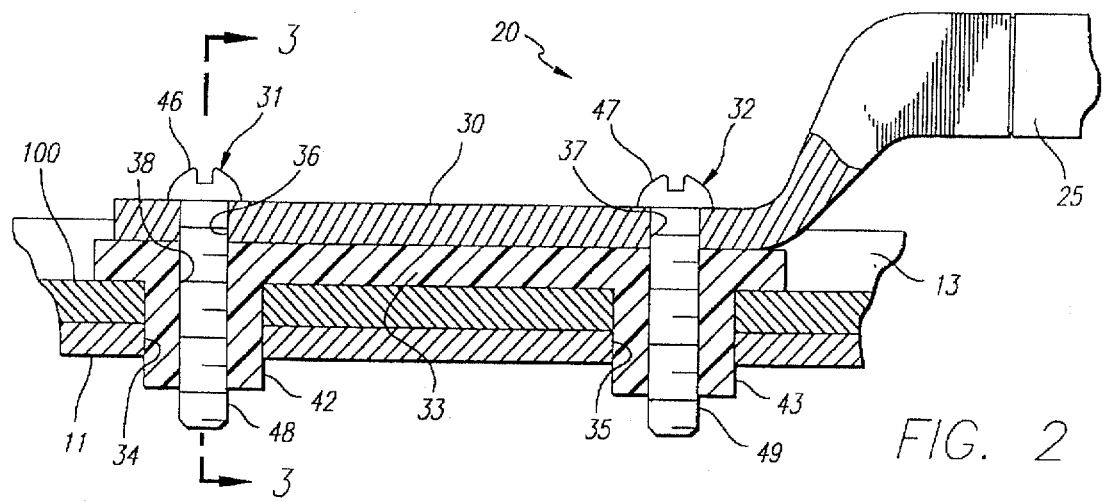
FIG. 2
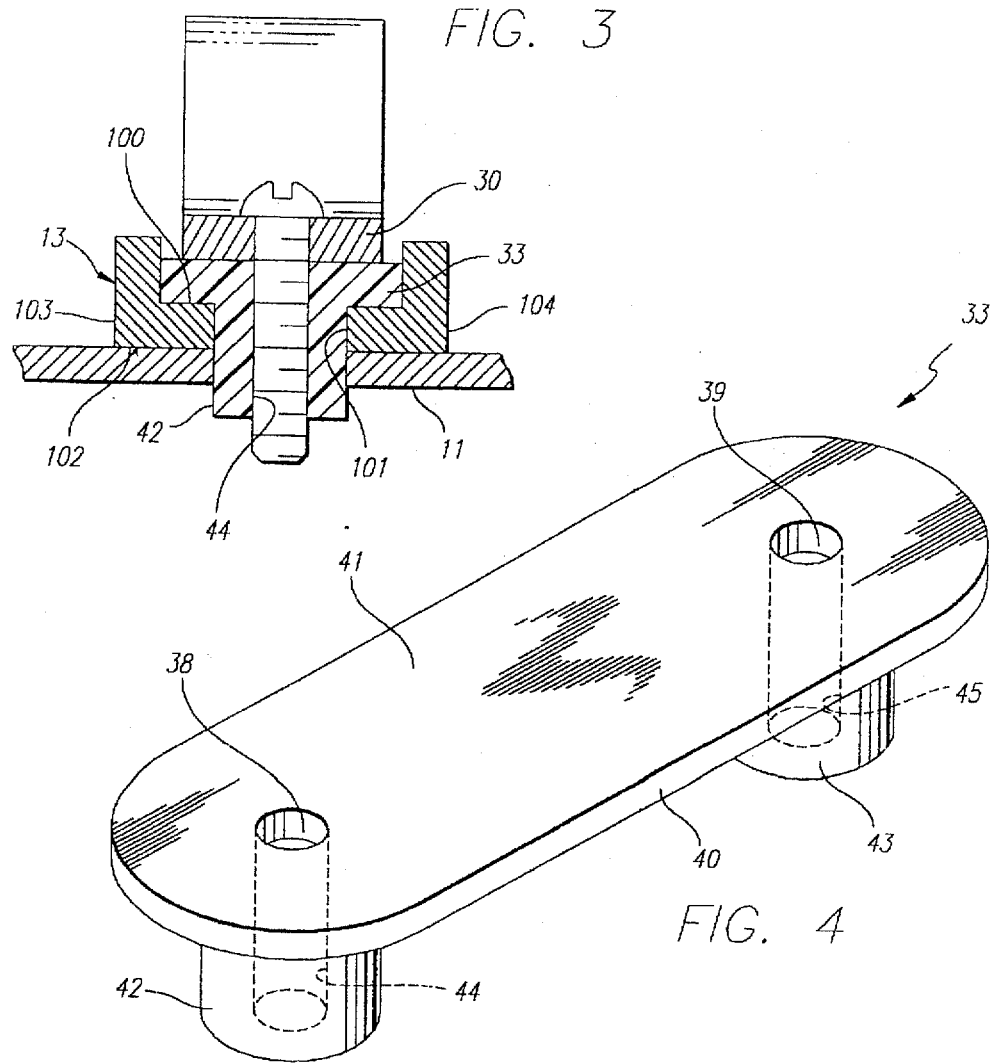
FIG. 3
FIG. 4

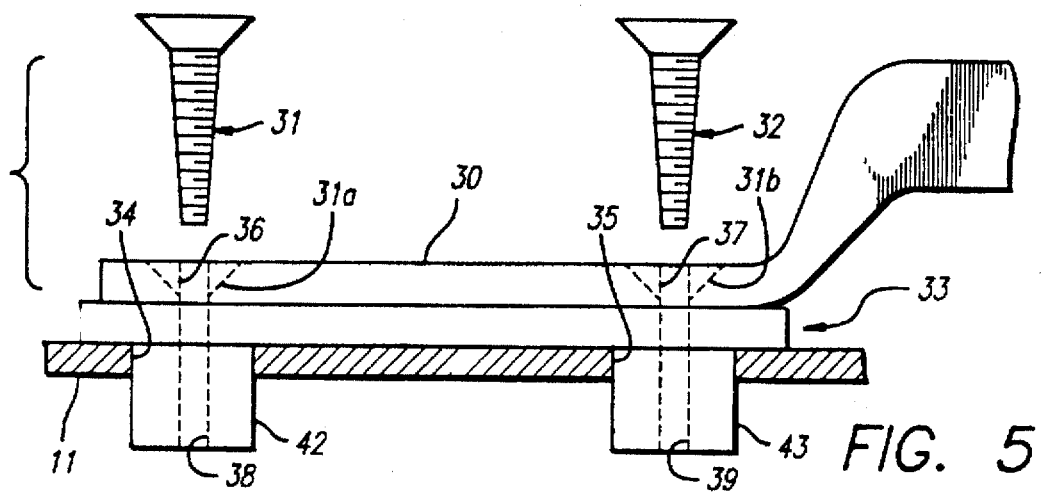
FIG. 5
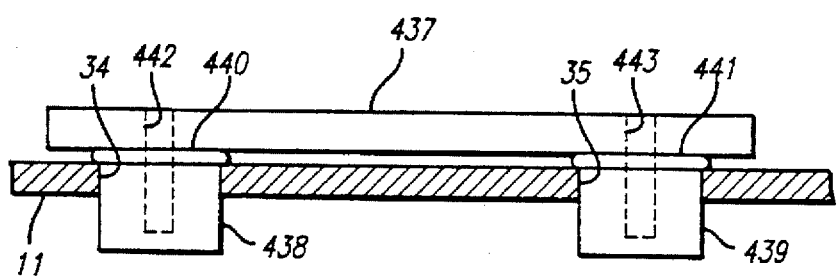
FIG. 6
FIG. 7
FIG. 8
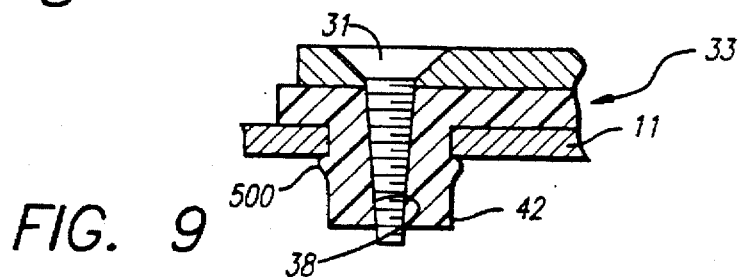
FIG. 9

VEHICLE ROOF RACK ASSEMBLY

BACKGROUND OF THE INVENTION

1. Field of the Invention

The invention relates to roof racks for vehicles; and, more particularly to an assembly for attaching a rack to the roof of a vehicle in a quick and efficient manner.

2. Description of the Prior Art

Various methods are known for detachably assembling roof racks, such as luggage carrier racks, to the roof of a vehicle. Generally, such racks having spaced rails having end holes which align with round holes through the roof of the vehicle at predetermined locations. These holes allow the rack to be secured to the vehicle roof. Some such arrangements are shown in U.S. Pat. Nos. 4,162,755; 4,277,009; and 4,448,336.

One of the problems encountered in prior art installations using an assembly line is cross-threading of the insert used to fix the rails of the luggage rack to the roof. This is to say that, when a standard threaded insert is installed in a hole in roof, and the mating screw is placed into it to hold the roof rack rail in place, many times the threads become cross-threaded and the assembly line must stop. Hence, there is a need for an insert that does not have a thread and will accept a self-tapping screw at a final installation.

To manufacture an insert without a thread is not a problem. However, installing a non-threaded insert into a blind round hole (from one side) a the same time preventing the insert from rotating when you install a self-tapping screw is a problem.

There is thus a need for a vehicle roof rack assembly wherein spaced rails of such racks are secured to the vehicle roof in a quick and efficient manner.

SUMMARY OF THE INVENTION

It is an object of this invention to provide a vehicle roof rack assembly which can be quickly and easily installed using round holes preformed in the roof of the vehicle.

It is a further object of this invention to carry out the foregoing object using unthreaded inserts extending into the vehicle roof holes that will accept a self-tapping screw at final installation.

It is still another object of this invention to carry out the foregoing object wherein the insert does not rotate within the vehicle roof holes.

These and other objects are preferably accomplished by providing a plurality of spanners which span a pair of spaced round holes through the roof of the vehicle at preselected locations. Each spanner includes a main body portion having spaced integral downwardly extending insert portions or apertured bosses which extend into the spaced round holes. These apertured bosses or holes are self tapping for receiving self tapping screws therein. Thus, the rails of the rack, having holes at each end aligned with the apertured bosses, receive a self tapping screw in each rail hole thereby securing the rail to the roof of the vehicle.

BRIEF DESCRIPTION OF THE DRAWING

FIG. 2 is an elevational view, partly in section, of a portion of the assembly of FIG. 1;

FIG. 3 is a view taken along lines 3—3 of FIG. 2;

FIG. 4 is a perspective view of a hole spanner in accordance with the teachings of the invention.

FIG. 5 is a view similar to FIG. 3 showing a spanner directly secured to the roof of the vehicle;

FIG. 6 is a view similar to FIG. 5 showing another modification of the spanner of FIG. 5;

FIG. 7 is a view similar to FIG. 6 showing still another modification of the spanner of FIG. 5;

FIG. 8 is a view similar to FIG. 1 showing still another modification of the spanner of FIG. 1; and FIG. 9 is a detail view of a portion of the embodiment of FIG. 5 after installation.

DESCRIPTION OF THE PREFERRED EMBODIMENT

Figure 1:
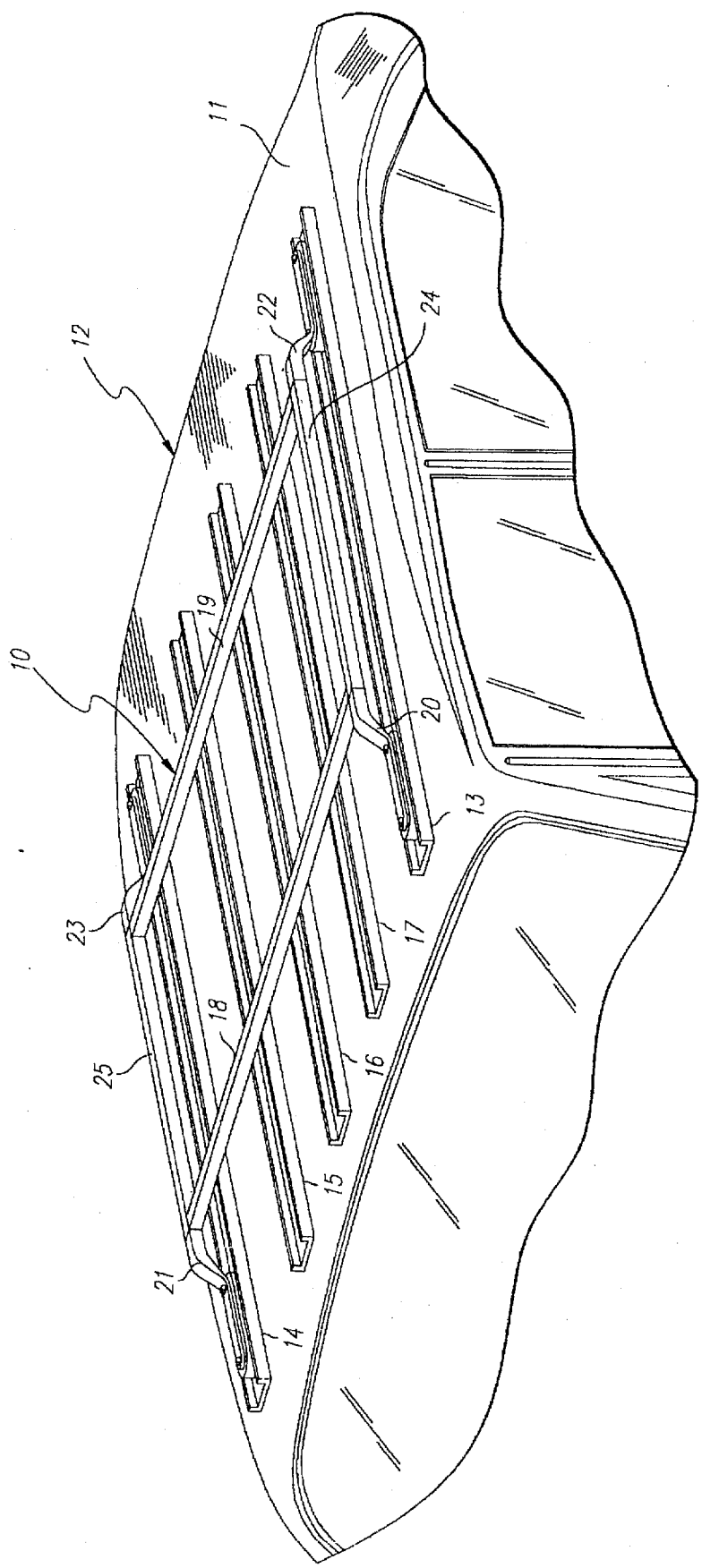
FIG. 1 is an elevated perspective view of a vehicle roof rack assembly in accordance with the teachings of the invention installed on the typical roof of a vehicle.

Referring to FIG. 1 of the drawing, a roof rack or luggage carrier assembly 10 is shown installed on the roof portion 11 of a vehicle 12. Roof rack 10 comprises a pair of longitudinally extending side rails 13, 14. A plurality of spaced slats, such as slats 15 through 17, may be provided between side rails 13, 14, equally spaced as shown, and generally parallel to side rails 13, 14 as is well known in the art.

A pair of cross-bars 18, 19 extend between side rails 13, 14 and are supported on rails 13, 14 by four stanchions, such as stanchions 20, 21 supporting cross-bar 18 and stanchions 22, 23 supporting cross-bar 19. Connecting rail 24 interconnects stanchions 20, 22 and connecting rail 25 interconnects stanchions 21, 23. The foregoing has generally described a conventional roof rack or luggage carrier assembly for a vehicle. As will be discussed, the teachings of this invention may be applicable to various types of roof rack or luggage carrier assemblies including those directly secured to a vehicle roof without interposed rails, such as rails 13, 14.

Thus, referring now to FIG. 2, one of the stanchions 20 (the others being identical) is shown coupled to rail 25 having an extension portion 30 secured to a channel 100 in rail 13 and to roof 11 by screws 31, 32, respectively, passing through hole spanner 33 (see particularly in FIG. 4) and as contemplated in the teachings of the invention. Each rail 13, as seen in FIG. 3, has a pair of spaced holes 101 through channel 100 (only one hole visible in FIG. 3). Channel 100 is defined by the bottom wall 102 of rail 13 and integral upstanding sidewalls 103, 104.

A pair of spaced round holes 34, 35 (FIG. 2) are drilled or otherwise formed in roof 11 aligned with like spaced holes 36, 37 in extension portion 30. As seen in FIG. 4, spanner 33 has an elongated oblong main body portion 40 with an upper wall 41 and a pair of spaced downwardly extending bosses or apertured protrusions 42, 43. Protrusions 42, 43 are preferably round and adapted to snugly fit in roof holes 34, 35. A pair of spaced holes 38, 39 extend through main body portion 40 aligned with the apertures in protrusions 42, 43.

As seen in FIG. 1, spanner 33 is adapted to span holes 34, 35 with bosses 42, 43 extending through holes 34, 35. Obviously, the spacing between holes 34, 35 is the same as the spacing between the apertures through protrusions 42, 43.

The holes 38, 39 aligned with holes or apertures 44, 45 (see the dotted lines—FIG. 4) through protrusions 42, 43 are adapted to receive therein a self tapping screw. Thus, as seen in FIG. 2, screws 31, 32 having enlarged slotted heads 46, 47, respectively, have integral threaded shank portions 48, 49, respectively, receivably in aligned holes 38, 44 and 39, 45, respectively.

Spanners 33 may be of any suitable material, such as plastic. In operation, spanner 33 is inserted through holes 34, 35 as previously discussed. The holes 36, 37 through extension portion 30 are aligned with the spanner holes 38, 39 respectively. Self-tapping screws 31, 32 are now inserted through aligned holes 36, 38, 44 and 37, 39, 45, respectively, and tightened thus firmly securing stanchion 20 to roof 11.

The foregoing is accomplished in a quick and easy manner without the problems encountered in past installations involving cross-threading of the inserts heretofore used. The foregoing assembly solves the problem of the need for stopping an assembly line when an insert becomes cross-threaded. Conventional round roof holes can be used.

Although a roof installation is disclosed in FIGS. 1 to 3 wherein the spanner 33 is mounted to a rail fixed to the vehicle roof 11, the spanner 33 could be attached directly to the vehicle roof. This is shown in FIG. 5 wherein like numerals relate to like parts of the elements of FIGS. 1 to 4. Thus, spaced holes 34, 35 are predrilled in roof 11 and the protrusions 42, 43 of spanner 33 snap directly into holes 34, 35, respectively. Self tapping threaded screws 31, 32 are inserted through holes 36, 37 in extension portion 30 and self thread into holes 38, 39 in spanner 33 as heretofore discussed.

In an assembly line process, after the spanner 33 is installed onto the roof rack, the car shall continue down the assembly line, until such time as the roof rack is attached. The roof rack will be attached using self-tapping screws and more than likely, they will have a counter-sunk head for entry into countersunk areas 31a and 31b, respectively, as seen in FIG. 5 to ensure flushness.

Although the spanner 33 is shown in FIG. 4 as having protrusions 42, 43 that are smooth on the exterior, as shown in FIG. 6, wherein like numerals refer to like parts of FIGS. 1 to 3, spanner 330, otherwise identical to spanner 33, has spaced protrusions 420, 430 each having a bead (421, 431 respectively), which is preferably resilient, which may extend about the entire outer periphery of its respective protrusions 420, 430. These beads 421, 431 may be an integral part of spanner 330 or secured to its respective protrusion and function as a snap-in mechanism, so that, as the spanner 330 is installed into the holes 34, 35 in the roof 11, the spanner 330 will not snap or pop back out as it bounces through the assembly line. These beads 421, 431 may make a complete circle around the protrusions 420, 430 as shown or it may be several spaced beads, preferably resilient and integral with its respective protrusion, as seen in spanner 436 in FIG. 7 wherein a plurality of spaced beads 432, 433 encircle protrusions 434, 345, respectively.

As seen in FIG. 8, where again like numerals refer to like parts of the embodiments of FIGS. 1 to 7, spanner 437 is shown having protrusions 438, 439. This embodiment may be used to eliminate the possibility of water intrusion into the roof 11 of the vehicle 12. This may be accomplished by incorporating O-rings 440, 441 on the bottom of the spanner 437. O-rings 440, 441 may then be squeezed during assembly to prevent water from leaking into the roof rack. Although O-rings 440, 441 may be separate from their respective protrusion, preferably they are injection molded in the form of small pads, working as O-rings, directly onto the protrusions 438, 439 of spanner 437. Spanner 437 may also have a blind hole such as holes 442, 443 in each protrusion 438, 439, respectively, that does not penetrate through the bottom of the respective protrusion to prevent water leakage from the inside of the screw area as seen in FIG. 8.

It is to be understood that, when the self-tapping screws 31, 32 enter into the respective protrusion of the spanner, the spanner will bulge out and prevent the insert from pulling out of the application. This is shown in FIG. 9 wherein the self tapping screw 31 of FIG. 5 has been tightened into spanner 33, in effect forming a thread therein by displaying the material of spanner 33, which may be of plastic. That is, basically, the inside diameters of the holes 38, 39, are small so that the material expands or bulges outwardly forming bulge 500 as the self-tapping screws displace the material comprising the spanner. This bulging effect ensures a tight fit in the roof rack and/or roof and prevents the spanner from coming out.

Although a particular embodiment of the invention has been disclosed, variations thereof may occur to an artisan and the scope of the invention should only be limited by the scope of the appended claims.

I claim:

1. A luggage carrier assembly for attachment to the roof of an automobile vehicle wherein pairs of spaced holes are provided in said roof comprising:

said carrier assembly comprising a pair of spaced parallel rails having spaced holes at each end thereof and a pair of stanchions connected at opposite ends of each of said rails, each of said stanchions being adapted to be secured to one of said pair of spaced holes in said roof;

each of said stanchions including an extension portion overlying one of said pair of spaced holes through said rails and having spaced holes aligned with the spaced holes in said roof and through said rail;

a spanner disposed between each of said extension portions and all flush with the same, each said spanner being elongated and having a main body portion and a pair of downwardly extending generally cylindrical spaced apertured protrusions, smooth on the exterior thereof, and a pair of spaced holes through said main body portion aligned with the apertures in said protrusions, said protrusions extending through said pair of holes through said rail and said roof; and a pair of self tapping screws, each of said screws having an enlarged head at one end and an integral elongated shaft portion at the other end respectively extending through the aligned holes in said extension portion, one of said apertured protrusions and said rail into one of the holes in said roof thereby securing said stanchions to said rail and said roof when said pair of screws are tightened and self threaded into said protrusions.

2. In the assembly of claim 1 wherein said spanner is of plastic.

3. In the assembly of claim 1 wherein said heads of said screws are slotted.

4. In the assembly of claim 1 wherein said holes in said roof are round and said protrusions are round in cross-section.

5. In the assembly of claim 4 wherein said protrusions are of plastic snugly fit into the spaced holes in said roof and the plastic material comprising said protrusions bulge outwardly when said screws are tightened therein firmly securing said protrusions in said holes in said roof.

6. In the assembly of claim 1 wherein each of said rails includes an elongated bottom wall, and a pair of elongated side walls on each elongated side of said bottom wall and connected thereto and upstanding therefrom defining an elongated channel, said spaced holes in said rails being through said channel.

7. A luggage carrier assembly for attachment to the roof of an automobile vehicle wherein pairs of spaced holes are provided in said roof comprising:

said carrier assembly comprising a pair of stanchions, each of said stanchions being adapted to be secured to one of said pair of spaced holes through said roof;

each of said stanchions including an extension portion overlying one of said pair of spaced holes in said roof and having spaced holes aligned with the spaced holes in said roof;

a spanner disposed between each of said extension portions and said roof and flush with the same, said spanner being elongated and having a main body portion and a pair of downwardly extending generally cylindrical spaced apertured protrusions smooth on the exterior thereof, and a pair of spaced holes through said main body portion aligned with the apertures in said protrusions, said protrusions respectively extending through said pair of holes through said roof; and a pair of self tapping screws, each of said screws having an enlarged head at one end and an integral elongated shaft portion at the other end respectively extending through the aligned holes in said extension portion and said apertured protrusions into the holes in said roof thereby securing said stanchions to said roof when said pair of screws are tightened and self threaded into said protrusions.

8. In the assembly of claim 7 wherein said spanner is of plastic.

9. In the assembly of claim 7 wherein said heads of said screws are slotted.

10. In the assembly of claim 7 wherein said holes in said roof are round and said protrusions are round in cross-section.

11. In the assembly of claim 7 wherein said protrusions are of plastic snugly fit into the spaced holes in said roof and the plastic material comprising said protrusions bulges outwardly when said screws are tightened thereon firmly receiving said protrusions in said holes in said roof.

12. In the assembly of claim 7 including a resilient roof O-ring disposed between the underside of the main body portion of said spanner and each of said protrusions which O-rings are compressed when said screws are tightened.

13. In the assembly of claim 7 wherein said apertures in said protrusions terminate therein before the terminal end of said protrusions remote from the main body portion of said spanner.

* * * * *